Feb. 23, 1954

A. J. FEDRI 2,669,885

VARIABLE TRANSMISSION

Filed May 10, 1951

Albeno J. Fedri
INVENTOR.

BY Clarence A. O'Brien
and Harvey B. Jackson
Attorneys

Feb. 23, 1954

A. J. FEDRI 2,669,885

VARIABLE TRANSMISSION

Filed May 10, 1951

Albeno J. Fedri
INVENTOR.

BY *Clarence A. O'Brien*
*and Harvey B. Jacobson*
Attorneys

Feb. 23, 1954 A. J. FEDRI 2,669,885
VARIABLE TRANSMISSION
Filed May 10, 1951 5 Sheets-Sheet 3

Albeno J. Fedri
INVENTOR.

BY *Clarence A. O'Brien*
*and Harvey B. Jackson*
Attorneys

Feb. 23, 1954

A. J. FEDRI 2,669,885

VARIABLE TRANSMISSION

Filed May 10, 1951

Albeno J. Fedri
INVENTOR.

BY *Lawrence A. O'Brien*
*and Harvey B. Jackson*
Attorneys

Feb. 23, 1954

A. J. FEDRI 2,669,885

VARIABLE TRANSMISSION

Filed May 10, 1951

Albeno J. Fedri
INVENTOR.

BY Clarence A. O'Brien
and Harvey B. Jacobson
Attorneys

Patented Feb. 23, 1954

2,669,885

UNITED STATES PATENT OFFICE 2,669,885

VARIABLE TRANSMISSION

Albeno J. Fedri, Weston, Pa.

Application May 10, 1951, Serial No. 225,597

25 Claims. (Cl. 74—750)

This invention comprises novel and useful improvements in a variable transmission and more specifically pertains to a variable and a concomitant variable torque and speed transmission which will admit of a large number of speed ratios between a driving and driven shaft while maintaining a positive mechanical driving connection therebetween.

The primary object of this invention is to provide a variable speed transmission which shall be capable of providing a large number of speed ratios between driving and driven members while maintaining a positive driving connection therebetween.

A very important object of this invention is to provide a variable speed gearing transmission having an advantageous construction of variable diameter orbit gear for use with an epicyclic gearing assembly or a plurality of epicyclic gear assemblies.

Another object of the invention is to provide a variable speed transmission having the power input and output members disposed about a common axis and having all motion about this axis in equilibrium at all times.

Yet another object of the invention is to provide a variable speed transmission in conformity with the foregoing objects having improved means for supporting and adjusting the variable diameter orbit gear.

Still another object of this invention is to provide a variable speed transmission requiring a minimum number of moving parts to provide the large number of speed ratios.

These, together with various ancillary features and objects of the invention, which will later become apparent as the following description proceeds, are attained by the present invention, a preferred example of which has been illustrated, by way of example, only, in the accompanying drawings, wherein.

Reference is now made more specifically to the accompanying drawings, wherein like numerals designate similar parts throughout the various views.

In general, the present invention obtains a large number of different speed and torque ratios between a driving and driven shaft while maintaining a positive mechanical connection therebetween through the use of an epicyclic gearing assembly connecting the shafts together with an internal orbit gear forming a part of the epicyclic gearing assembly and which orbit gear is of adjustable diameter. In order to adjust the diameter of the orbit gear, the latter is formed by a sprocket chain which is supported upon the interior of a cone constituting a carrier for the gear. Mechanism is provided for maintaining the sprocket chain gear against movement, but slidingly mounting the chain upon the internal surface of the cone as the latter is adjusted axially to thereby vary the diameter of the gear. The slack or excess of the sprocket gear chain is passed through a slot in the side of the cone to thus permit variations in the circumference of the annular gear formed by that portion of the sprocket chain which lies within the core. Synchronous adjusting mechanism is provided for simultaneously causing axial movement of the cone and corresponding radial movement of guides mounted within the cone and which hold the sprocket chain orbit gear against axial movement.

I. General organization

The principles of this invention are obviously applicable in a wide variety of ways and in a great diversity of mechanisms. The invention is especially useful in the power transmission mechanisms of lathes and other industrial machinery for providing a large number of speed and torque ratios between the driving and driven shafts of the same while maintaining at all times a positive mechanical connection therebetween. However, it is evident that certain features of the invention, as for example the adjustable gearing assembly, may be independently employed wherever it is desired to transmit power through varying speed ratios by means of gearing assemblies.

The embodiment illustrated in the drawings of this application is deemed to be suitable and satisfactory for use in the power transmitting mechanism of industrial machinery of various types wherein varying speeds and torques are required. As shown best in Figures 1 and 7, there is provided a stationary housing or casing of any desired construction and which includes a pair of separable housing members 10 and 12 which may be conveniently secured together as by an annular shouldered joint 14. It will be especially noted that the casing section 10 is provided with a closed end wall portion 16 having circumferentially spaced, arcuate slots 18 for a purpose which will be later set forth. The casing section 12 has a closed end wall 20 which is likewise provided with similar slots 22. The end walls 16 and 20 are disposed on opposite ends of the casing sections from the shoulder joint 14 and have the arcuate slots 18 and 22 disposed about a common axis.

Figure 1:
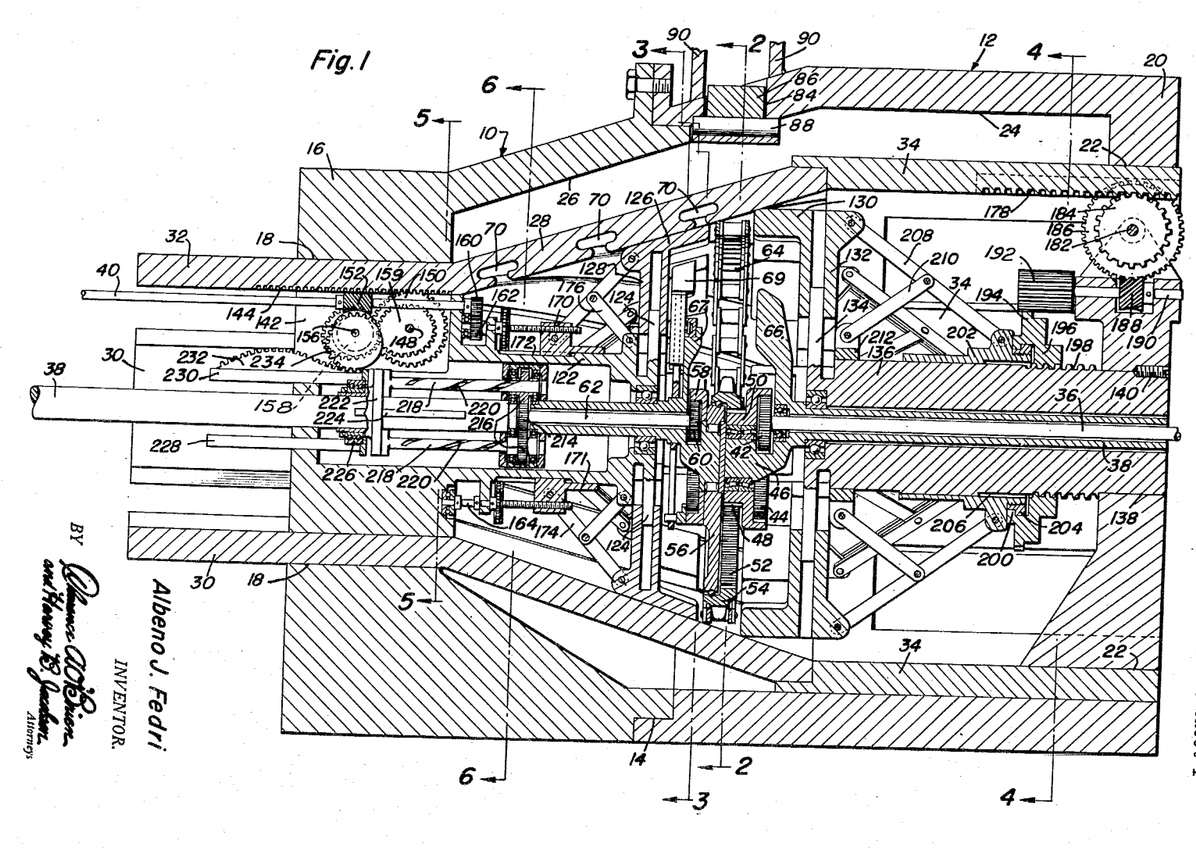
Figure 1 is a central vertical longitudinal sectional view through a transmission assembly illustrating therein the principles of this invention, parts being broken away.

As will be best seen from Figure 1, the casing section 12 is provided with a cylindrical interior surface or wall 23 which defines a cylindrical chamber therein, while the casing section 10 is provided with a conical internal wall 26 providing a conical chamber which intersects and merges into the chamber 24.

Figure 5:
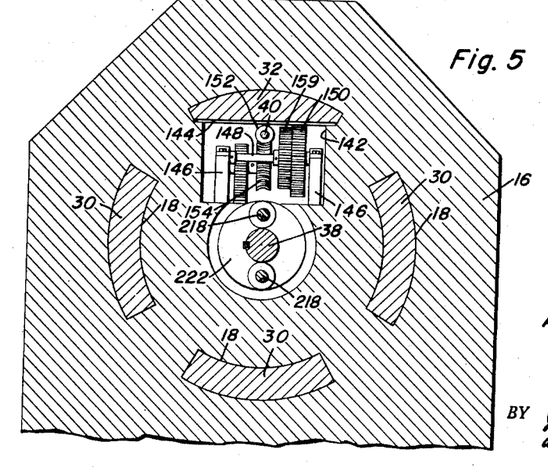
Figure 5 is a vertical transverse sectional view taken substantially upon the plane indicated by the section line 5—5 of Figure 1.

An adjusting cone 28 is mounted within the casing sections 10 and 12 in a manner to permit axial sliding movement but prevent relative rotation between the cone and the casing. For this purpose, the cone 28 is provided with supporting guides in the form of parallel axial extensions or fingers 30 extending from the smaller end of the cone. These fingers 30 are of arcuate cross section, as shown in Figure 5, four such fingers being shown at equally spaced angular intervals, one of these fingers such as that at 32 being of a slightly different shape as shown in Figure 5 for a purpose to be subsequently set forth.

The fingers 30 are slidable through the above mentioned arcuate slots 18 whereby the smaller end of the cone is mounted for axial sliding movement but is prevented from rotation relative to the casing sections.

Figure 4:
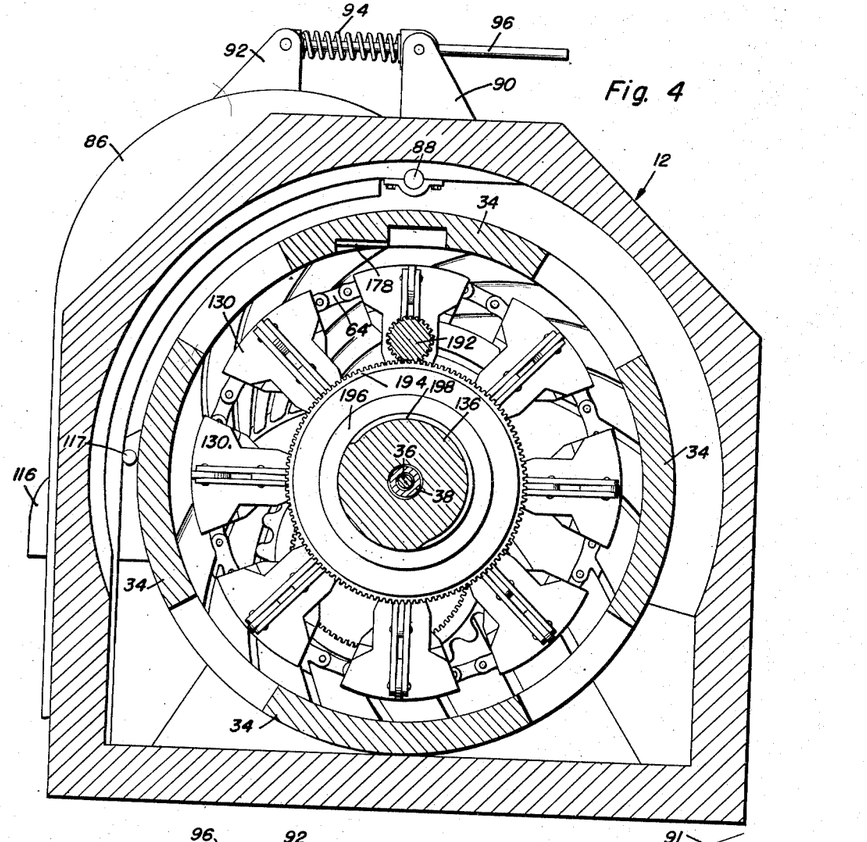
Figure 4 is a vertical transverse sectional view taken substantially upon the plane indicated by the section line 4—4 of Figure 1.

In a similar manner, the larger end of the cone is provided with parallel axially extending fingers or guide members 34, which as shown in Figure 4 are likewise of arcuate cross section and are equidistantly spaced from each other in a circumferential manner. The fingers or projections 34 are slidably received in the above mentioned arcuate slots 22 in the end wall 20 of the casing section 12 whereby the larger end of the cone is likewise prevented from rotation but mounted for axial sliding moment.

The cone constitutes a carrier or support for supporting and for adjusting the diameter of a sprocket chain which constitutes an orbit gear of an epicyclic gearing assembly to be set forth hereinafter. The arrangement is such that axial sliding movement of the cone relative to the axially stationary orbit gear serves to selectively increase or decrease the diameter of the orbit gear and consequently the number of its gear teeth and thereby vary the speed ratios between driving and driven shafts as set forth hereinafter.

Referring again to Figures 1 and 7, it will be seen that the assembly is provided with a power input or driving shaft 36 which extends into the casing section 12, and with a concentrically disposed power output or driven shaft 38 which extends into the casing section 10, both of these shafts extending into the cone. Within the cone 28, inside the casing section 10, is provided an epicyclic gearing assembly which operatively connects the shafts 36 and 38 and transmits power therebetween at varying gear ratios as set forth hereinafter.

A control shaft 40 extends into the casing section 10 and into the cone for operating a mechanism whereby the cone 28 is shifted axially in order to vary the gear ratio as set forth hereinafter.

II. Epicyclic gearing assembly

Reference is made more particularly to Figure 1 for an understanding of the epicyclic gearing assembly connecting the shafts 36 and 38. The shaft 38 comprises a unitary member, either integral or formed with rigidly connected sections which extend from without the casing section 10 entirely through the section 10 into the section 12. In some instances, it may be found expedient to extend the shaft 38 entirely through the section 12 whereby power may be taken from both ends of the shaft 38. At least the right hand portion of the shaft 38 is tubular and surrounds and rotatably receives the shaft 36. It is to be understood that suitable bearing assemblies are provided for journaling the shafts 36 and 38. The shaft 36 constituting the power input or driving shaft has fixedly secured to its inner end a spur gear 42 constituting a sun gear which is eccentric to and is continuously in mesh with the internal gear 44 which is rotatably journaled upon the eccentric sleeve 46 by means of bearing assemblies, which eccentric sleeve is integrally formed upon the shaft 38.

An external gear 48 is formed upon the other end of the rotatable sleeve 50 upon which is provided the internal gear 44. This external gear is disposed eccentrically of and is continuously in mesh with the internal gear 52 which is formed upon the sprocket gear 54 which in turn is journaled by a suitable bearing assembly upon the eccentric disk 56. The eccentric disk 56 is in turn journaled upon sleeve 46 by suitable antifriction bearings and has fixedly mounted thereon an internal gear 58 which in turn is in mesh with an adjusting gear 60 secured to one end of an adjusting shaft 62 journaled within the tubular shaft 38.

The arrangement is such that upon rotation of the adjusting shaft 62, as set forth hereinafter, the gear 60 will cause rotation of the gear 58 and this in turn will cause radial movement of the eccentric disk 56 thereby moving the sprocket gear 54 radially outwardly or inwardly with respect to the axis of the shaft 38.

The teeth of the sprocket gear 54 are continuously in mesh with the sprocket gear chain 64 which constitutes a variable diameter orbit gear as set forth hereinafter, this orbit gear being mounted upon the interior surface of the cone 28 whereby upon relative sliding movement of the cone with respect to the sprocket chain, the latter will have its diameter varied.

As so far described, it will now be apparent that rotation of the input shaft 36 will through the gear 42 and the internal gear 44 cause rotation of the sleeve 50 and through the latter by means of the external gear 48, will cause rotation of the sprocket gear 54 by means of the internal gear 52. Since the sprocket gear is in mesh with the stationary orbit gear consisting of the sprocket chain 64, the sprocket gear will rotate about the axis of the shafts 36 and 38 and travel about the inner circumference of the orbit gear. By virtue of the eccentric arrangement, this orbital movement of the sprocket gear will in turn produce rotation of the shaft 38 in a manner well understood in the art.

Obviously, by varying the relative diameters of the eccentrics, as well as by using replacement members 50 having different ratios of gear teeth 44 and 48, various speed ratios can be obtained. Further, it is obvious that sprocket gears having different numbers of sprocket teeth as well as teeth on the internal gear 52 may likewise be employed to further increase the number of possible gearing ratios obtainable. However, it is preferred in the present invention to vary the speed ratios by varying the number of links in the sprocket chain which constitute the stationary orbit for the planetary sprocket gear 52. The structure and mechanism for this purpose will be subsequently set forth.

Although the drawings illustrate but one form of epicyclic gearing assembly, this is only for simplification of the disclosure, and the principles of the invention not to be considered as limited to the form of gearing set forth, since obviously various equivalent arrangements of gearing could be employed. As illustrated, the main power train consists of the shaft 36, gears 42, 44, 50 and 52, sprocket 54 and the shaft 38 in conjunction with the eccentrics 46 and 56.

A suitable counterbalance or counterweight arrangement such as 66 and 67 fixed to the shaft 38 and a movable, automatically compensating, weight as 69 may be provided for counterbalancing the eccentric disks and gears associated therewith. Since the present invention, however, is not limited to any particular counterbalancing means, further explanation is believed to be unnecessary.

III. Cone carrier and adjuster for orbit gear

Figure 3:
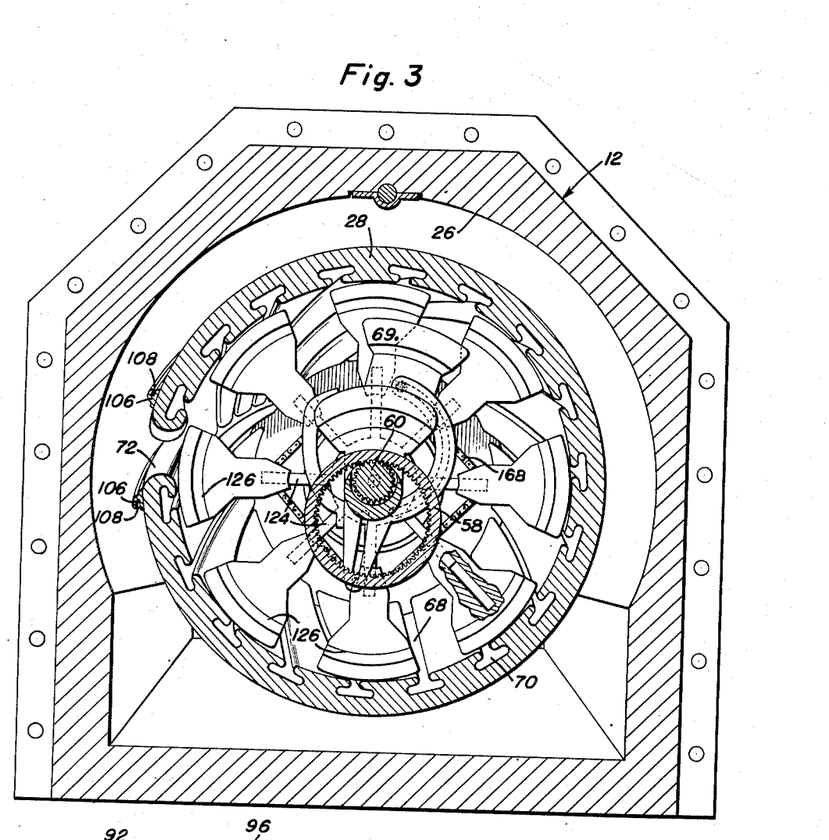
Figure 3 is a vertical transverse sectional view taken substantially upon the plane indicated by the section line 3—3 of Figure 1.
Figure 6:
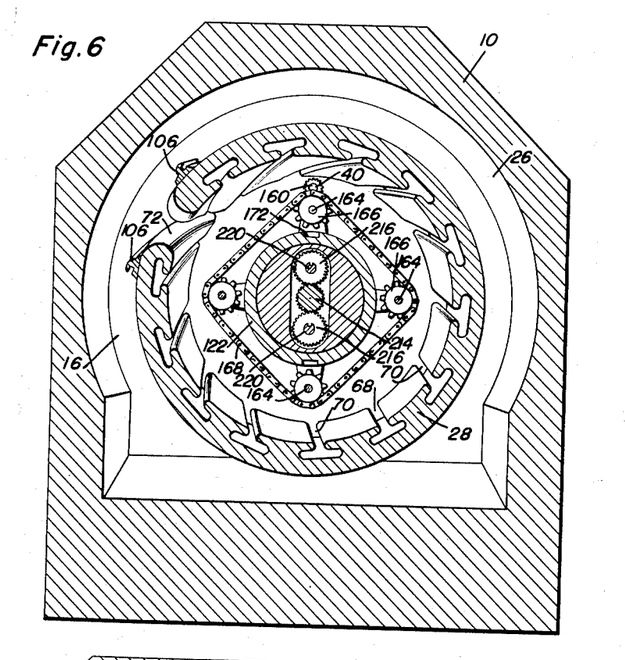
Figure 6 is a vertical transverse sectional view taken substantially upon the plane indicated by the section line 6—6 of Figure 1.

The interior surface of the cone is provided with a plurality of axially extending undercut slots or guideways. One of these slots, such as that indicated at 68 in Figures 3 and 6 is a straight slot which lies along an element of the conical surface. The other slots 70 are appropriately curved so as to be equidistant from each other and from the straight slot 68. As shown, each of these slots is T-shaped in cross section with the bottom wall of the slot undercut with respect to the neck opening of the slot.

Figure 7:
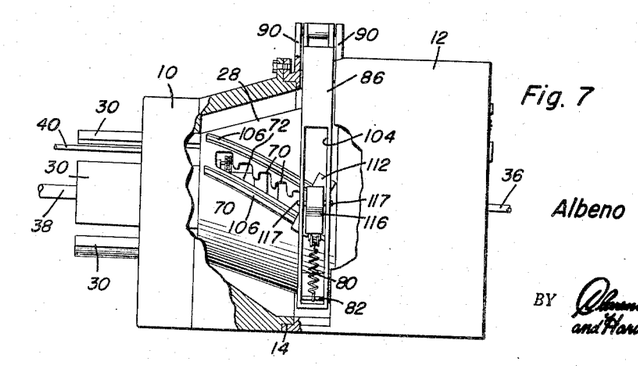
Figure 7 is a side elevational view of the embodiment of Figure 1, parts being broken away to show the internal construction of the same.

A curved chain inlet slot 72, see Figure 7, extends through the wall of the cone in a curving generally axial direction along the same. This slot constitutes means for adding links to the chain disposed upon the inner circumference of the cone or removing such links in order to vary the diameter of the chain gear in response to axial sliding movement of the cone to which the chain is slidably connected. The width of the slot is sufficiently restricted so that the portion of the chains disposed therein forms a substantially complete annular gear.

Figure 10:
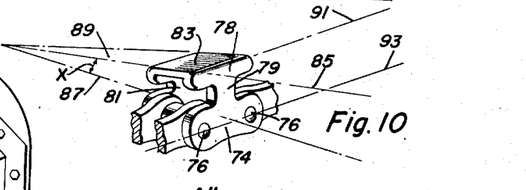
Figure 10 is a fragmentary perspective view of a link of the sprocket chain forming the orbit gear.

The chain 64 is preferably of any conventional and known type of sprocket gear chain consisting of a plurality of links 74, see Figure 10, pivotally connected by pins and rollers 76. However, certain of the links are provided with T-shaped slides 78, which are of corresponding cross sectional shape to that of the slots 68 and 70. It is understood that the shape of the slides 78 will be such that throughout the entire range of their sliding movement in the grooves 68 and 70, the inner circumference of the sprocket chain will have a cylindrical rather than conical shape in order to provide efficient operative engagement with the sprocket gear 54.

The links 74 upon which are provided the slides 78 may conveniently be fabricated as a single integral member, as shown in Figure 10. Thus a single sheet metal blank of the requisite size and shape may be folded into a U-shaped clip, with the web portion thereof constituting the slide 78, the two legs 79 and 81 of the clip being of unequal length and comprising the sides of the link 74. The side has the flat surface 83 adapted to slidingly engage the bottom wall of the grooves 68, 70. The different lengths of the legs 79, 81 causes the plane through their pivot pins 76 to form a dihedral angle with the plane of the surface 83. This dihedral angle, indicated diagrammatically at X in Figure 10 by the lines 85 and 87 is the same angle as that between the axis and an element of the cone's internal surface.

Although it is intended that the links of the sprocket chain shall lie in the same plane perpendicular to the axis of the cone, it is evident that the various grooves 68, 70, lying upon the internal surface of the cone, will lie at varying angles to that plane and to each other. Consequently it will be necessary for each of the plates on which the surfaces 83 are formed to be disposed at different angles with the planes of the sides 79 and 81. In other words, the adjacent edge of the surface 83, indicated by the line 91 will form an angle with the plane of the side 79, indicated by the line 93. The angle between the vertical planes containing the lines 91 and 93 will be zero for the groove 68, but will vary for each of the other grooves in pairs on opposite sides of 68.

Figure 2:
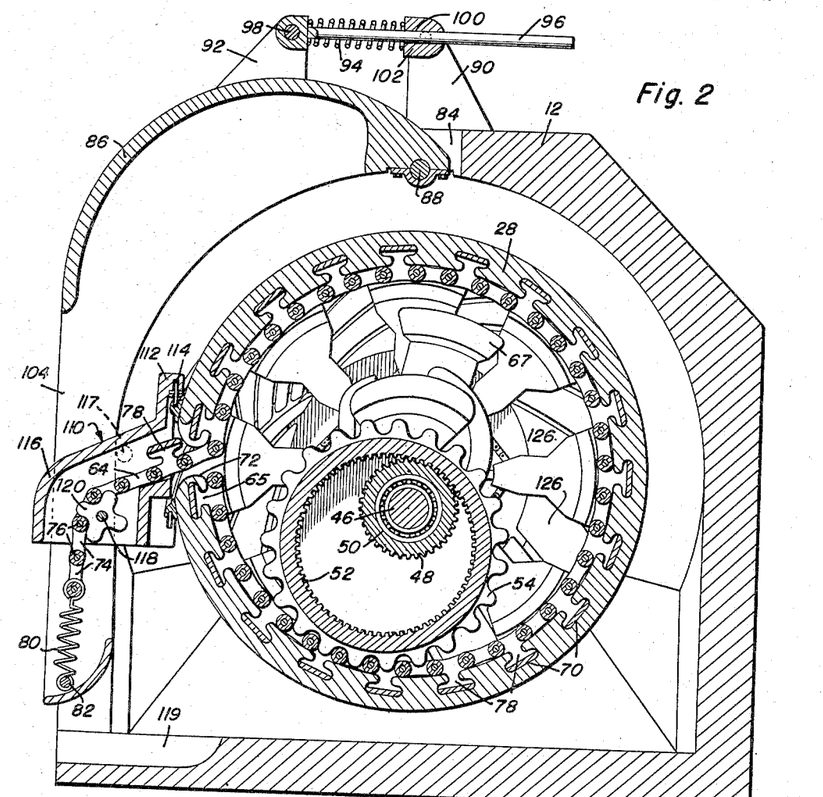
Figure 2 is a vertical transverse sectional view, taken substantially upon the plane indicated by the section line 2—2 of Figure 1 and illustrating certain details of the variable diameter orbit gear and the slack take-up means for the same.

As clearly shown in Figure 2, the endmost link 65 of the sprocket chain is provided with one of the slides 78 and this is received in the groove 70 which is adjacent to the slot 72. Each of the succeeding grooves in turn receives one of the slides so that the entire circumference of the chain is secured to and closely conforms to the conical inner surface of the cone throughout the entire circumference of the same, the other end of the sprocket chain passing through the slot 72 whereby the excess links constituting the slack of the chain may be yieldingly urged as by a tension spring 80 secured to a suitable anchor or abutment 82 upon the exterior of the casing to thereby take up tension in the slack of the chain.

As so far described, it will now be understood that with the slides 78 of the chain 64 received in the grooves 68 and 70, that upon axial sliding movement of the cone, the entire annular chain constituting the orbit gear will be circumferentially increased, additional links being inserted through the slot and disposed in the ends of the grooves or splines 70 which intersect this slot as shown in Figure 7.

Thus, the diameter of the orbit gear may be varied including the number of teeth in the same, whereby the gear ratio with the meshing sprocket gear will be altered.

Although the cone is shifted axially in order to adjust the diameter of the sprocket chain orbit gear, the latter remains in the same transverse plane through the mechanism. Means are provided as set forth hereinafter for guiding and holding this orbit gear sprocket chain stationary in this transverse plane, and the device further includes a guide means disposed upon the exterior of the casing for carrying and guiding the excess links which have been or are to be fed through the slot 72 during adjustment of the device.

The cone, as illustrated and described hereinbefore has the slot 72 disposed as a curve and inclined to an element of the cone. It is also possible, and in some particular uses may be preferred, to form this slot upon an element of the cone, as suggested in the diagrammatic view of Figure 12; or to provide two equidistant slots with a pair of chains associated therewith, as in Figure 11. In a manner similar to that of Figure 11, various numbers of slots and chains may be utilized.

Figure 12:
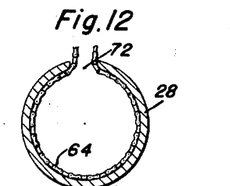

In the modified construction of Figure 12, the cone 28 has the single slot 72 disposed along an element of the cone and diametrically opposite the previously mentioned groove or spline 68. The chain 64 therefore has its two end portions extending through the slot 72 for the simultaneous adding or removing of links as the internal portion of the chain is circumferentially lengthened or shortened. The construction and operation of this form of the invention is identical with that previously described except for the foregoing modification.

Figures 9, 11:
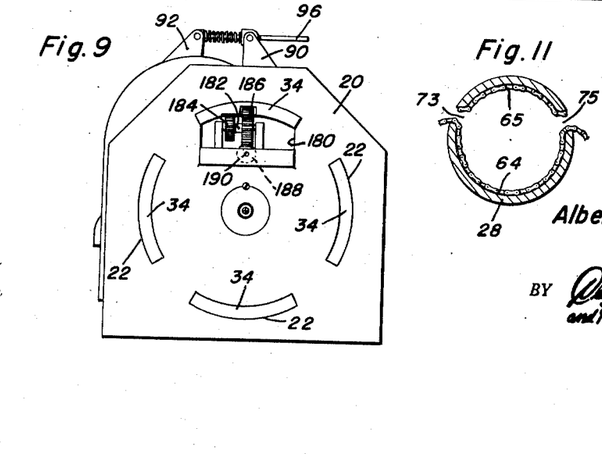
Figure 9 is an end elevational view of the opposite end of Figure 1 from that of Figure 8.
Figures 11 and 12 are diagrammatic views in vertical transverse sections through the cone, showing alternative constructions of the sprocket chain orbit gear.

A somewhat different principle of operation is utilized in Figure 11. Here the cone 28 has two equidistantly spaced slots, 73 and 75 of the same construction as set forth for the slots 72 hereinbefore described. The internal orbit gear is here formed by two chains 64 and 65, an end of each chain being disposed adjacent to or extended through each slot 73, 75. Preferably, the chain 65 has its ends terminating at the slots, this chain being of unvarying length during axial shifting of the cone. Of course, due to its unvarying length, the chain 65 will comprise a varying portion of the variable diameter orbit gear. The chain 64 comprises the portion of the orbit gear in which all of the circumferential variation occurs. The midportion of this chain has a slide received in a groove or spline disposed along that element of the internal cone surface which is midway between the two slots 73, 75. The opposite ends of this chain 64 are simultaneously lengthened or shortened through the slots 73, 75.

IV. *Orbit gear chain carriage*

As shown best in Figures 1 and 2, the casing section 12 is provided with a transverse circumferential slot 84 and an arcuate arm 86 is pivotally mounted in this slot as by a pivot pin 88. This arm constitutes a movable closure for the slot 84 and is yieldingly urged into a position closely adjacent to the side of the cone throughout the range of axial adjustment of the latter, as shown in Figure 2. For that purpose, the casing section 12 and the arm 86 are provided with upstanding lugs 90 and 92 respectively with a compression spring 94 interposed therebetween. A spring rod 96 is pivoted to the lug 92 as by a pivot pin 98 and the spring 94 surrounds this rod. The other extremity of the rod is freely slidable in a bore 100 carried by a journal block 102 pivotally mounted upon the lug 90. As will be better seen by a comparison of Figures 2 and 4, the lugs 90 and 92 are bifurcated to journal the rod 96 and the block 102 therebetween. By this means, the spring 94 urges the arm 86 into a position inwardly of the slot 84.

As shown more clearly in Figures 2 and 7, the lower portion of the arm 86 is longitudinally slotted at 104 thus providing a guide slot. Upon opposite sides of the slot 72, as shown in Figures 2, 3, 6 and 7, are a pair of equidistant upstanding guide ribs or rails 106 which upon their outer sides are provided with guide channels 108. A guide carriage indicated generally by the numeral 110 has a base portion 112 provided with a pair of guide rollers 114, each rotatably received in one of the channels 108 whereby the guide carriage is secured to the guide rails for relative movement therealong as the cone is axially adjusted. The carriage is further provided with an outwardly extending casing 116 which is slidably received in the guide slot 104. The casing 116 and base 112 are provided with a passage extending therethrough which communicates with the interior of the cone through the slot 72 and with the slot 104. Disposed adjacent the outlet end of the casing 116 is an axle 118 having a guide sprocket 120 thereon over which the chain 64 is entrained as clearly shown in Figure 2. The casing 116 is further provided with guide means such as the laterally projecting bosses or pins 117, see Figures 2 and 7, which slide upon the inner surfaces of the arm 86. It will thus be seen that the carriage is maintained in and guided in the plane of the sprocket gear by the walls of the slot 104; is movable circumferentially upon the side of the cone and guided in such movement by the tracks 106 and rollers 114, and is retained against the cone by the tracks 106 and rollers 114, the arm 86 and guide pins 117 and by the spring 94.

It will be apparent that as the cone is adjusted axially, the base 112 of the carriage 110 will move axially along the cone upon the guide rails 106 and the radial inward and outward movement of the carriage with respect to the axis of rotation of the shaft 38, will be accommodated by oscillating movement of the arm 86 against the resistance of the spring 94, this arm constituting a guide which permits this radial movement of the carriage while retaining the latter in the same transverse plane with respect to the axis of rotation of the shaft 38.

The section 12 may be notched or cut away as at 119 to permit radially inward swinging movement of the lower end of the arm 86.

V. *Internal guide assembly for orbit gear*

In the preceding section there has been described the means whereby the external portion of the orbit gear is maintained in the same fixed transverse plane. It is, however, necessary that internal means be provided for holding the internal portion of the orbit gear against movement from the fixed transverse plane as the cone carrier of the orbit gear is shifted axially to vary the diameter of the gear. Upon what may be termed the inner and outer sides of the orbit gear, and within the cone, are provided relatively movable guides which retain the orbit gear in the same fixed transverse plane.

The inner guide assembly consists of an axial, sleeve-like inward extension 122 of the wall 16 of the casing section 10, which extension at its extremity is provided with fixed radially extending guide fingers 124. Any suitable number of these fingers may be provided, eight such fingers being shown in Figure 3. Guide shoes 126 are provided having conical exterior surfaces which are complemental to and slidably engage the conical inner surface of the cone 28 and having radially extending tubular bosses 128 which are telescopically received upon the guide fingers 124. Obviously, other equivalent guideway means could be utilized, as preferred, within the principles of this invention. The inner edges of the shoes 126 lie in abutting engagement with the adjacent edge of the sprocket chain orbit gear 64, as clearly shown in Figure 1, and constitute a guide or abutment for that side of the sprocket chain.

The outer guide assembly includes a set of shoes 130, the edges of which are likewise adapted to engage the adjacent vertical face of the sprocket chain orbit gear 64. This second set of shoes likewise has tubular bosses 132 which are telescopingly and slidingly received upon radial guide rods 134 integrally or fixedly secured to the inner extremity of a bushing 136 extending through and supported by the bore or aperture 138 of the end wall 20 of the casing section 12. This bushing is retained in the end wall in non-rotative position as by a fastening set screw 140.

It will thus be apparent that the two sets of guide shoes 126 and 130 embrace opposite sides of the stationary orbit gear sprocket chain 64 to retain the latter in the same stationary transverse plane despite axial shifting of the cone. However, this axial shifting of the cone necessitates radial adjustment of these shoes to correspond to the increase in diameter of the sprocket chain during its adjustment.

A synchronized adjusting mechanism is provided for axially shifting the cone; radially adjusting the inner and outer guide assemblies; and simultaneously therewith radially shifting the sprocket gear of the epicyclic gearing assembly to cause the same to remain in mesh with the diametrically enlarged orbit gear.

VI. *Synchronous adjusting mechanism for cone, internal guide assemblies and sprocket gear*

Figure 8:
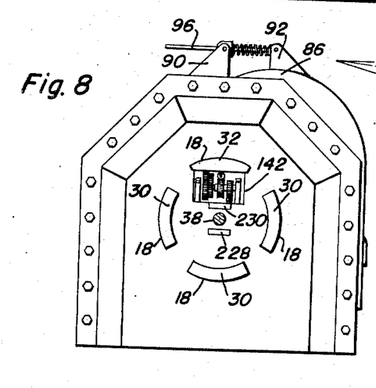
Figure 8 is an end elevational view of the arrangement of Figure 1.

As shown more clearly in Figure 5, and also in Figure 8, the end wall 16 of the casing section 10 is provided with a recess or cutaway portion forming a chamber 142. The guide finger 32 of the cone extends through the top of this chamber 142 and is provided with a depending rack portion 144. Suitably journaled in the chamber 142 as by parallel supporting standards 146 is a shaft 148 having a rack actuating gear 150 thereon. It will now be evident that by rotating the shaft 148, the gear 150 engaged with the rack 144 will cause axial movement of the cone. As previously mentioned, this axial shifting movement of the cone is guided by the sliding engagement of the fingers 30, 32 and 34 through the arcuate guide slots 18 and 22.

Fixedly secured to the adjusting shaft 40 previously mentioned is a worm gear 152 which is in mesh with a gear 154 secured to a transverse shaft 156. This shaft carries a scroll gear 158 which meshes a second scroll gear 159 on the shaft 148 to cause rotation of the aforesaid gear 150 to axially adjust the cone.

However, at its extremity, the shaft 40 is provided with a further gear 160 which meshes with the gear 162. This latter gear is fixedly secured to one of a plurality of guide adjusting shafts 164 suitably journaled and supported upon the above mentioned sleeve extension 122. The shafts 164, as shown best in Figure 6, are provided with sprocket gears 166 about which is entrained a sprocket chain 168 which thus connects these shafts for simultaneous operation. Each of the shafts is externally screw threaded and engages internally screw threaded projections or lugs 170 which are carried by or integrally formed on a sleeve 171 slidable upon and secured to the extension 122 by splines 172 formed upon the exterior surface thereof. Thus, upon rotation of the shafts, the sleeve 171 will be shifted axially. A linkage assembly connects each of the lugs 170 with one of the guide shoes 126. For this purpose there is provided a main link 174 which is terminally pivoted to one of the lugs and to a shoe 126, together with an auxiliary link 176 terminally pivoted to bosses upon the end of the extension 122 and to the midportion of the links 174. This linkage, upon sliding movement of the guide blocks, imparts a rectilinear radial movement to the shoes 126, and the gear ratios of 160 and 162 together with the pitch of the screw threaded shafts and lugs 170 are so selected as to correlate the radial movement of the shoes to the axial shifting movement of the cone to thereby maintain the shoes in snug sliding engagement with the interior surface of the cone as the latter is adjusted.

As will be appreciated, the control shaft 40 thus serves to adjust the axial movement of the cone and, at the same time, correlates and synchronizes the radial movement of the guide blocks 126 to correspond.

In order to correlate and synchronize the adjustment of the outer guide assembly, a somewhat similar guide shoe actuating mechanism is provided. For this purpose, one of the fingers 34 is provided with rack teeth 178 and the end wall 20 of the casing section 12 is likewise cutaway to provide a chamber 180 as suggested in Figure 9. Journaled in this chamber is a transverse shaft 182 having a rack actuating gear 184 fixedly secured thereto and meshing with the rack bar 178. The shaft 182 is further provided with a helical gear 186 which in turn meshes with a helical gear 188 carried by the shaft 190. The shaft 190 is provided with a gear 192 which is continuously in mesh with an external ring gear 194 upon the periphery of a traveling nut 196 which is threadedly engaged upon the screw threaded portion 198 of the bushing or sleeve 136. The traveling nut 196 is provided with an inturned annular flange 200 which is clamped but rotatably connected to a bushing 202 as by a retaining nut 204, which may be adjusted through an opening (not shown) in nut 196. This bushing 202 is splined as at 206 to the sleeve 136 for axial movement thereon while relative rotative movement is prevented. A linkage system connects the sleeve 202 with each of the shoes 130 of the outer guide assembly. This linkage consists of a link 208 terminally pivoted to the sleeve 202 and to one of the shoes 130, while an auxiliary link 210 is terminally pivoted to the link 208 intermediate its ends and to a ring 212 fixedly secured upon the sleeve 136.

The gear ratios and arrangements are such that as the cone is shifted by the above mentioned control shaft 40, the rack 178 will cause rotation of the gear 184, of the shaft 182 and by means of the gears 186 and 188, 192 and 194, cause axial sliding movement of the sleeve 202 and thereby effect radial adjustment of the shoes 130.

It will, however, be readily understood that as the cone is shifted axially, it is not only necessary to adjust the inner and outer guide assemblies, but also to effect a radial adjustment of the sprocket gear 54 in order that the latter may remain in mesh with the changing diameter of the orbit gear 64. Accordingly it is desired to synchronize the adjusting means for the sprocket gear with the cone shifting means. The synchronizing means for adjusting the sprocket gear is as follows.

As previously mentioned, rotation of the shaft 62 will through the gears 60 and 58 adjust the eccentric disk 56 and thereby cause the necessary radial adjustment of the sprocket gear. Upon its outer extremity, the shaft 62 is provided with a gear 214 which is continuously in mesh with a pair of gears 216 which are rotatably and slidably carried by a pair of axially slidable adjusting shafts 218. The shafts 218 are provided with spiral grooves or threads 220 to which the gears 216 are splined so that upon axial movement of these shafts, rotation of the gears will be effected. These shafts are fixedly carried by a disk or plate 222, this plate being slidably received upon the shaft 38 and being splined thereto as by a spline or keyway 224 for rotation with the shaft 38 and for axial movement upon the same. The plate 222 is provided with an annular shifting or adjusting ring 226. Secured to the adjusting ring 226 are a pair of axially extending bars or fingers 228 and 230, see also Figure 8. The fingers 228 and 230 extending through suitable slots in the end wall 16 prevent rotation of the shifting ring 226. However, when axial movement is imparted to these fingers, the plate 22 together with associated mechanism will be shifted inwardly, thereby causing relative rotation of the gears 216 and 214 with respect to the shaft 38, thereby shifting the eccentric mechanism to adjust the same. This axial movement of the members 228 and 230 is effected by providing a rack member 232 upon the member 230 which rack member meshes with a gear 234 carried by the shaft 156. Preferably the gear 234 is a scroll gear and the rack gear 232 is of an appropriate contour to mesh with the scroll gear during rotation of the latter.

It will now be apparent that the control shaft 40 will simultaneously axially shift the cone 28; adjust the eccentric mechanism radially in timed relation to the shifting of the cone; directly simultaneously adjust the inner guide assembly 126 and through the rack 178 secured to the cone also adjust the outer guide assembly 130 in synchronization therewith.

The scroll gear assemblies 232, 234 and 158, 159 are employed to impart the requisite varying rate and extent of adjustment of the eccentric system and the inner and outer guide assemblies and of the cone to accommodate the addition or removal of successive links from the orbit gear. The exact gear ratios will depend upon the particular dimensional constants of a particular mechanism. It will be readily understood that the particular gearing arrangements shown and described are illustrative only, and various equivalents therefor will readily occur to the skilled mechanic.

From the foregoing, the construction and operation of the device will be readily understood and further explanation is believed to be unnecessary. However, since numerous modifications and changes will readily occur to those skilled in the art, it is not desired to limit the invention to the exact construction shown and described and, accordingly, all suitable modifications and equivalents may be resorted to falling within the scope of the appended claims.

Having described the invention, what is claimed as new is:

1. A variable speed transmission including power input and output shafts, an epicyclic variable speed gear assembly operatively connecting said shafts, said gear assembly including an orbit gear consisting of a sprocket chain, a carrier for said orbit gear, means mounting said orbit gear upon said carrier for relative sliding movement between said orbit gear and said carrier to vary the diameter of said orbit gear, means for imparting movement to said carrier to effect relative sliding movement between the carrier and orbit gear.

2. The combination of claim 1 including guide assemblies holding said orbit gear stationary during sliding movement of said carrier.

3. The combination of claim 1 including guide assemblies holding said orbit gear stationary during sliding movement of said carrier, said orbit gear and said guide assemblies being disposed within said carrier.

4. The combination of claim 1 wherein said carrier comprises a hollow drum having a slot, said sprocket chain being mounted upon the interior of said drum and having a portion extending through said slot, a carriage positioned adjacent said drum slot, said carriage having guide means engaging said extending portion of said chain.

5. The combination of claim 1 wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter.

6. An epicyclic variable speed gear assembly including an orbit gear consisting of a sprocket chain, a carrier for said orbit gear, means mounting said orbit gear upon said carrier for relative sliding movement between said orbit gear and said carrier to vary the diameter of said orbit gear, means for imparting movement to said carrier to effect relative sliding movement between the carrier and orbit gear.

7. The combination of claim 6 including guide assemblies holding said orbit gear stationary during sliding movement of said carrier.

8. The combination of claim 6 including guide assemblies holding said orbit gear stationary during sliding movement of said carrier and means for adjusting said guide assemblies toward and from said carrier.

9. The combination of claim 6 wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter.

10. The combination of claim 1 including guide assemblies holding said orbit gear stationary during sliding movement of said carrier, means for adjusting said guide assemblies toward and from said carrier.

11. The combination of claim 1 including guide assemblies holding said orbit gear stationary during sliding movement of said carrier, and wherein said carrier comprises a hollow drum having an axial slot, said sprocket chain being mounted upon the interior of said drum, and having a portion extending through said slot, a carriage positioned adjacent said drum slot, said carriage having guide means engaging said extending portion of said chain.

12. The combination of claim 1 including guide assemblies holding said orbit gear stationary during sliding movement of said carrier, and wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter.

13. The combination of claim 2 and means for adjusting said guide assemblies toward and from said carrier.

14. The combination of claim 2 wherein said carrier comprises a hollow drum having an axial slot, said sprocket chain being mounted upon the interior of said drum, and having a portion extending through said slot, a carriage positioned adjacent said drum slot, said carriage having guide means engaging said extending portion of said chain.

15. The combination of claim 2 wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter.

16. The combination of claim 2 and means for adjusting said guide assemblies toward and from said carrier wherein said carrier comprises a hollow drum having an axial slot, said sprocket chain being mounted upon the interior of said drum, and having a portion extending through said slot, a carriage positioned adjacent said drum slot, said carriage having guide means engaging said extending portion of said chain.

17. The combination of claim 2 and means for adjusting said guide assemblies toward and from said carrier wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter.

18. The combination of claim 2 and means for adjusting said guide assemblies toward and from said carrier and means for operating simultaneously and in synchronized relation the carrier adjusting means and the guide assembly adjusting means.

19. The combination of claim 2 and means for adjusting said guide assemblies toward and from said carrier wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter, means for operating simultaneously and in synchronized relation the carrier adjusting means and the guide assembly adjusting means and the eccentric adjusting means.

20. The combination of claim 6 including guide assemblies holding said orbit gear stationary during sliding movement of said carrier and means for adjusting said guide assemblies toward and away from said carrier, wherein said epicyclic gear assembly includes a planetary eccentric, a planetary gear journaled on said eccentric and engaging said orbit gear, means for adjusting said eccentric radially of the axis of the orbit gear to maintain contact between the planet and orbit gears during adjustment of the latter, means for operating simultaneously and in synchronized relation the carrier adjusting means and the guide assembly adjusting means.

21. The combination of claim 1 wherein said mounting means comprises slides carried by the links of the sprocket chain and axially slidable upon the interior surface of the carrier, said slides being disposed at such an angle with respect to the sides of the links as to maintain the sides of the links in a perpendicular plane transverse the axis of the carrier as the slides move relative to the conical surface of the carrier.

22. The combination of claim 21 wherein one of said links consists of an integral U-shaped strip, the legs of the strip comprising the side walls of the link and the web of the U-shaped strip comprising the slide of the link.

23. The combination of claim 22 wherein one leg is longer than the other whereby the web is disposed at a predetermined dihedral angle to the plane of the pivot pins of the link.

24. The combination of claim 23 wherein said dihedral angle equals the angle between the axis of the cone carrier and an element of the conical surface thereof.

25. The combination of claim 21 wherein one of said links consists of an integral U-shaped strip, the legs of the strip comprising the side walls of the link and the web of the U-shaped strip comprising the slide of the link, the web of the clip being twisted with respect to the side walls of the link to enable the latter to remain in a plane normal to the axis of the carrier when the web is received in a spline groove of the carrier that is inclined relative to an element thereof.

ALBENO J. FEDRI.

References Cited in the file of this patent

UNITED STATES PATENTS

| Number | Name | Date |
| --- | --- | --- |
| 787,080 | Conant | Apr. 11, 1905 |
| 892,325 | Steinle | June 30, 1908 |

FOREIGN PATENTS

| Number | Country | Date |
| --- | --- | --- |
| 15,229 | Great Britain | Oct. 28, 1915 |
| 240,872 | Switzerland | June 1, 1946 |